United States Patent (10) Patent No.: US 7,792,131 B1
Ma et al. (45) Date of Patent: Sep. 7, 2010

(54) QUEUE SHARING WITH FAIR RATE GUARANTEE

(75) Inventors: Sha Ma, San Jose, CA (US); Karthik Mandakolathur, Milpitas, CA (US)

(73) Assignee: Cisco Technologies, Inc., San Jose, CA (US)

( * ) Notice: Subject to any disclaimer, the term of this patent is extended or adjusted under 35 U.S.C. 154(b) by 0 days.

(21) Appl. No.: 12/401,577

(22) Filed: Mar. 10, 2009

(51) Int. Cl.
H04L 12/28 (2006.01)

(52) U.S. Cl. .................. 370/412; 370/428; 370/389; 370/235; 370/230; 710/52

(58) Field of Classification Search ............ None
See application file for complete search history.

(56) References Cited

U.S. PATENT DOCUMENTS

| 6,765,867 | B2 | 7/2004 | Shanley | |
| 6,829,245 | B1 | 12/2004 | Medina | |
| 2007/0171929 | A1 * | 7/2007 | Kim et al. | 370/412 |
| 2007/0223482 | A1 * | 9/2007 | Wyatt | 370/392 |
| 2009/0252035 | A1 * | 10/2009 | Fukunaga et al. | 370/230.1 |

OTHER PUBLICATIONS

Cisco Catalyst 3750 Metro Series Switch Enhanced Services Ports Deliver Advanced QoS Features for Metro Ethernet Service Providers, Cisco Systems, 2004 available on the Web at http://www.cisco.com/warp/public/cc/pd/si/casi/ps5023/prodlit/miser_wp.pdf.
The Cisco QuantumFlow Processor: Cisco's Next Generation Network Processor, Cisco 2008 available on the Web at http://www.cisco.com/en/US/prod/collateral/routers/ps9343/solution_overview_c22-448936.pdf.
Cisco 7600 Series Spa Interface Processor-600, Cisco Systems 2005 available on the Web at http://www.cisco.com/en/US/prod/collateral/routers/ps368/product_data_sheet0900aecd8033998f.pdf.

* cited by examiner

*Primary Examiner*—Bob A Phunkulh
(74) *Attorney, Agent, or Firm*—Charles Krueger

(57) ABSTRACT

In one embodiment, separate rate meters are maintained for each flow enqueued an increased at a target rate while a packet from the flow occupies the head of a shared transmit queue. The meter value is decreased by the packet length when a packet in enqueued or dropped. The next packet that occupies the head of the shared transmit queue is dropped if the meter value corresponding to the flow is greater than a threshold.

21 Claims, 8 Drawing Sheets

123# QUEUE SHARING WITH FAIR RATE GUARANTEE

TECHNICAL FIELD

The present disclosure relates generally to reducing the effects of head of line blocking on transmission bandwidth.

BACKGROUND OF THE INVENTION

Packets from different flows are received at a network device which represents a queuing point where packets belonging to various flows may become backlogged while waiting to be transmitted from the network device. A scheduler processes information associated with the head packet in each queue to determine which packet should be transmitted. The scheduler guarantees a minimum packet transmission rate to each queue where the sum of the guaranteed transmission rates must not be greater than the packet transmission rate of the channel. Thus, the packet transmission rate of the channel is much greater than the packet transmission rate guaranteed to any queue.

Packets are transmitted serially through the channel. When the channel is idle the scheduler selects a head packet from one of the queues, based on some priority scheme, and forwards it to the channel for transmission. Each queue has its packets transmitted as if it were the only source using a channel having a channel packet transmission rate equal to the guaranteed packet transmission rate of the queue.

Network devices are required to support many thousands of multicast groups. To provide a queue per multicast group can be too costly as queue scheduling is difficult to scale especially at high bandwidth. Practical designs let multiple groups share a queue in order to reduce the number of queues, but this creates head of line blocking (HOLB).

At the transmitter, head of line blocking occurs because queues are implemented as first-in-first-out transmit buffers. If the packet at the head of the buffer experiences backpressure then it blocks the transmission of all following packets in the buffer.

DESCRIPTION OF EXAMPLE EMBODIMENTS

Overview

Figure 1:
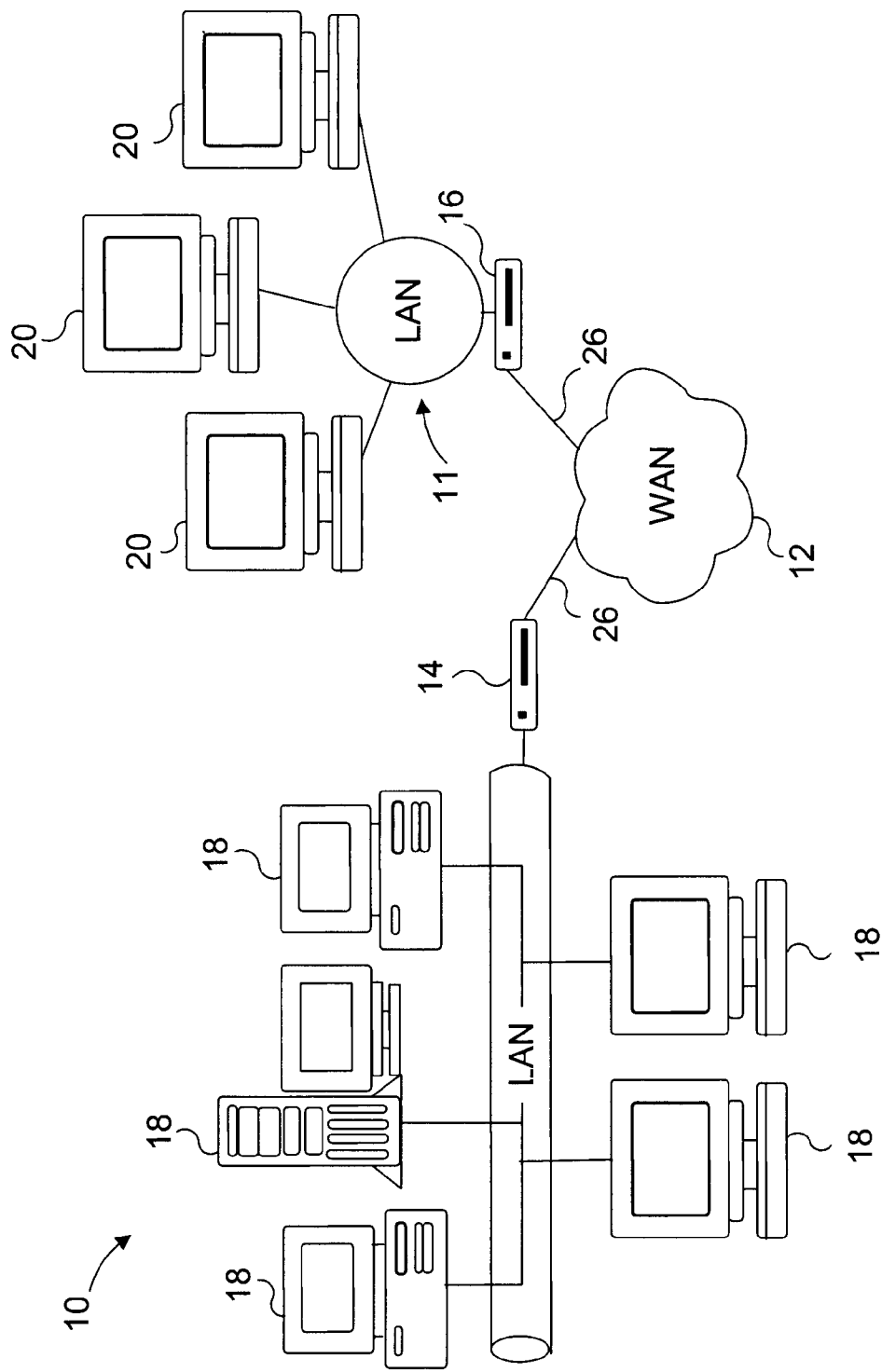
FIG. 1 illustrates an example network environment.

In an example embodiment a first meter value is changed at a target rate in a first direction, where the first direction is either positive or negative, while a first packet of a first flow occupies the head of a shared transmit queue enqueing packets from different flows, with the first meter value indicating the amount of time the packet in the first flow occupies the head of the shared transmit queue and with the first packet characterized by a packet length indicating the number of bytes transmitted when the first packet in the first flow is dequeued and the first meter value is changed in a second direction, where the second direction is opposite the first direction, by a multiple of the packet length of the first packet in the first flow when the first packet in the first flow is dequeued or dropped.

A second meter value is changed at the target rate in the first direction while a first packet of a second flow occupies the head of the shared transmit queue, with the second meter value indicating the amount of time the first packet in the second flow occupies the head of the shared transmit queue and with the first packet in the second flow characterized by a packet length indicating the number of bytes transmitted when the first packet in the second flow is dequeued and the second meter value is changed in the second direction by a multiple of the packet length of the first packet in the second flow when the first packet in the second flow is dequeued or dropped.

The first meter value is compared to a threshold value when a second packet in the first flow occupies the head of the queue and the second packet in the first flow is dropped if the difference between the first meter value and the threshold value has a first sign, where the first sign is either positive or negative, or the second packet in the first flow is scheduled for dequeing if the difference between the first meter value and the threshold value has a second sign.

As soon as the next packet in the first flow is either dequeued or dropped, the next packet in the queue is eligible for dequeue scheduling, i.e., the queue does not remain blocked by packets of the first flow.

The second meter value is compared to the threshold value when a second packet in the second flow occupies the head of the queue and the second packet in the second flow is dropped if the difference between the second meter value and the threshold value has the first sign or the second packet in the second flow is scheduled for dequeing if the difference between the second meter value and the threshold value has the second sign, where the second sign is opposite the first sign.

One packet belonging to more than one flow is permissible, in which case each meter changes in the second direction as the packet is dequeued or dropped on behalf of the relevant flow and increases between the time the packet appears at the head of the queue and the time it is either dequeued or dropped on behalf of the relevant flow.

DESCRIPTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase an "example embodiment" at various places in the specification does not necessarily refer to the same example embodiment.

FIG. 1 depicts an example network environment in which the example embodiments described below can be implemented. FIG. 1 depicts first and second Local Area Networks (LANs) 10 and 11 coupled to a Wide Area Network (WAN) 12 by first and second network devices 14 and 16 respectively. In this example the WAN 12 is implemented by a packet switched network and the LANs are Ethernet networks.

Various devices 18 in the first LAN 10 may establish connections with devices 20 on the second LAN 11 and vice versa with each connection termed a session and with a session including one or more flows. Each flow is a stream of data from a particular source to a particular destination or, in the case of multicast, multiple destinations. Each network device may be coupled to other LANs (not shown) by different ports.

A router or switch (network device) directs packets from an input to an output. As described above, in certain situations such as supporting multicast groups, many groups must share a single queue to reduce cost. A typical HOLB scenario resulting from sharing a single queue is depicted in FIG. 2 where packets from three different flows, which in this example are multicast groups, are serviced by a single queue.

Figure 2:
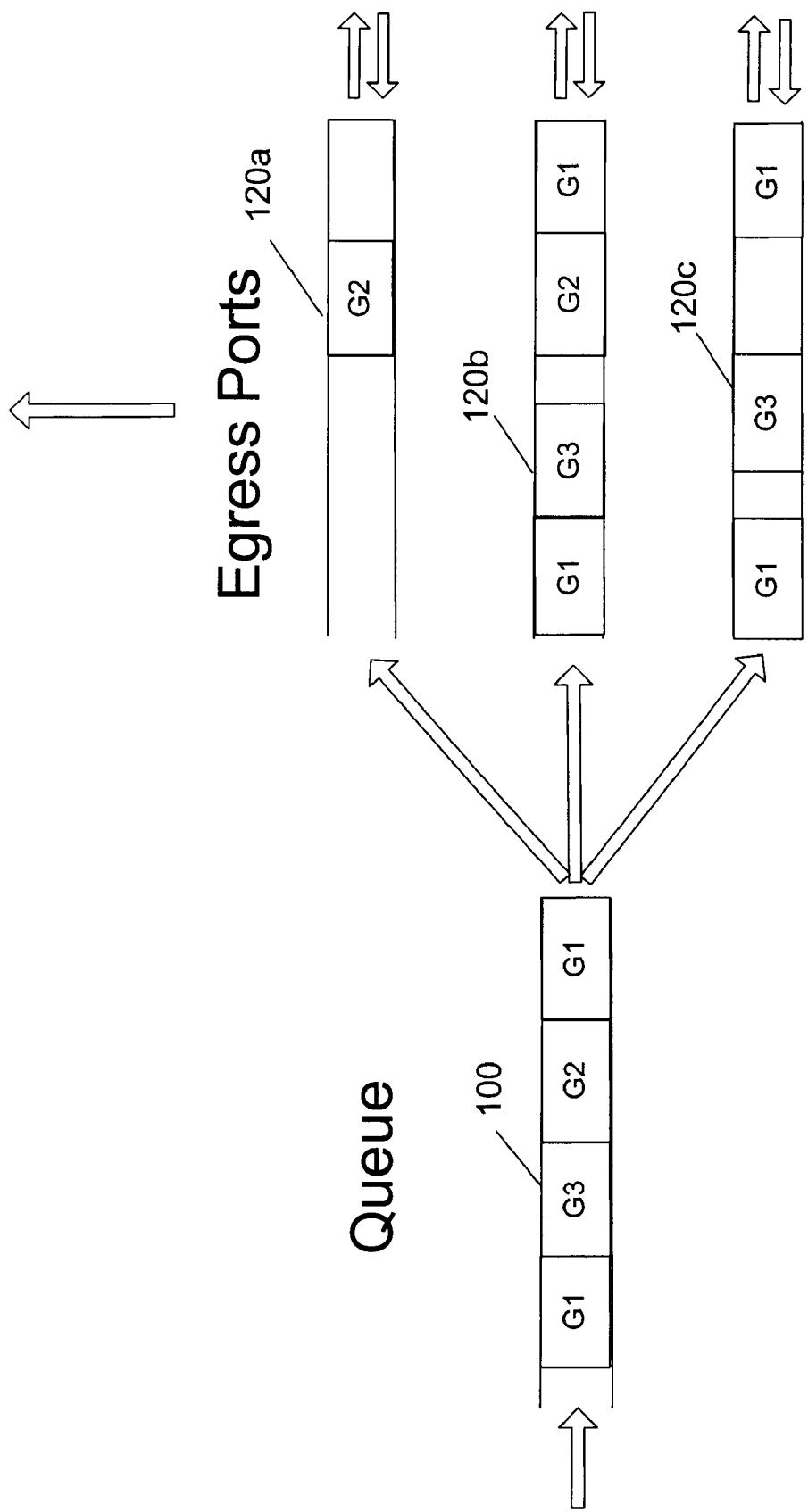
FIG. 2 illustrates an example of head of line blocking.

In FIG. 2 a shared transmit queue 100 is serviced by first, second and third egress ports 120a-c. Of the three egress ports, the second and third egress ports 120a and 120c subscribe to Group1 and Group3 and the first and second egress ports 120a and 120b subscribe to Group2.

Queue 100 does not need to be a physical queue in the sense that all packets in the queue are located in sequence in the same storage device. Queues are logical first in, first out ("FIFO") queues. Packets are stored somewhere in a storage device accessible to the scheduler.

In this example, the packet from Group3 is processed more slowly when dequeued to port 120b and causes the packets from Group1 to experience blocking even for dequeue to port 120c, even though port 120c is available.

There are different reasons why Group3 packets may be slower. It may be due to some restrictions specific to Group3, that the second port 120b is slower than the other ports, e.g., the second port may be a Gigabit Ethernet port where other ports are 10 Gigabit Ethernet ports, or that the port is busy with other types of packets.

A transmitting device must be able to prevent head of line blocking from degrading performance beyond acceptable limits. The guaranteed rates for each flow must be maintained by the scheduler. One solution is to drop the head of line packet so that other packets can be serviced.

Figure 3A:
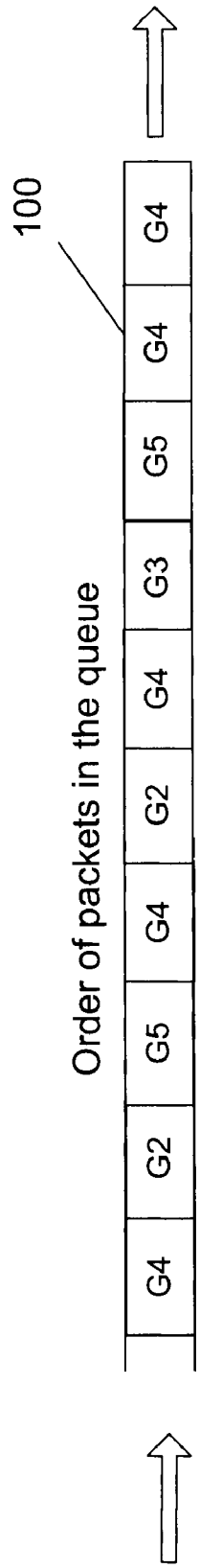
FIGS. 3A and B illustrate an example of the operation of a legacy rate meter.

A legacy rate meter solution for implementing this type of solution to head of line blocking is depicted in FIGS. 3A and B. FIG. 3A depicts a shared transmit queue holding Group2, Group3, Group4 and Group5 packets.

Figure 3B:
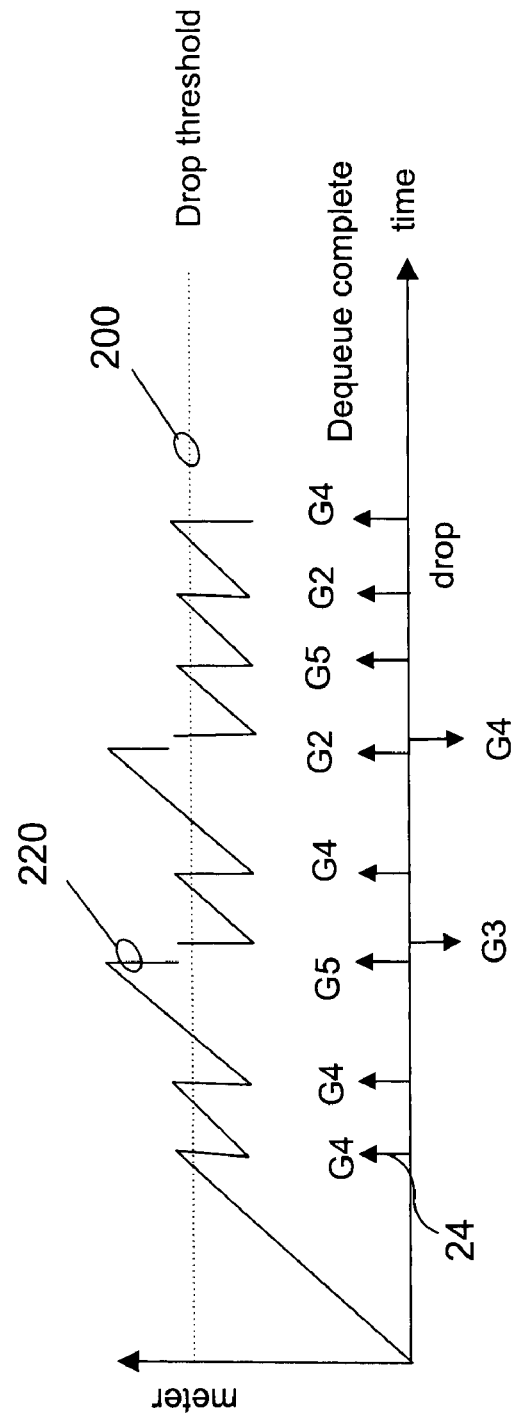

FIG. 3B depicts the operation of the real time rate meter. In FIG. 3B a drop threshold is indicated by dotted line 200 and the value of the meter is indicated by the solid line 220. Up and down arrows 240 marks the moments when a packet is completely dequeued (up arrow) or dropped (down arrow), with the flow number of that packet marked.

The operation of the legacy rate meter will now be described. The meter value counts up at a constant rate when the packet at the head of the queue is occupied. When a packet is dequeued or dropped the length of the packet is subtracted from the meter value.

Note that the meter value increases from zero and is greater than the threshold when the first Group4 packet dequeues. When the packet length is subtracted the meter value goes below the threshold so when the next Group4 packet appears at the head of the queue the meter value is below the threshold, the queue is considered in-profile, and the packet is not dropped.

The first Group5 packet occupies the head of the queue for an excessive period before it is completely dequeued. This causes the meter value to rise by so much that the meter value does not drop below the threshold when the packet is dequeued and the packet length is subtracted from it. Consequently the queue is considered out-of-profile. When the next packet in the queue from Group3 is scheduled, it is immediately dropped, and its length immediately subtracted from the meter value.

Since no time has passed the meter value has no chance to rise and so it goes below the threshold when the length of the Group3 packet is subtracted from the meter value. The queue falls back in-profile and so the next packet, from Group4 will not be dropped when it appears at the head of the queue.

The legacy rate meter is reset when the queue becomes un-backlogged.

The legacy rate meter solution can guarantee that the queue makes forward progress at or above a minimum target rate. The legacy rate meter solution is implemented by specifying a meter update interval (T) and an incremental value per update (Q) specified in bytes. Where Q and T define the target rate: $r=Q/T$.

A threshold is specified to provide some burst tolerance, i.e., the length of time the dequeue rate is allowed to be below target while the average rate is compliant before packets start to be dropped.

The legacy solution can define a worst case latency for a queue which is defined as maximum_queue length/minimum_rate. As an example, if the maximum_queue length is 500 kb and the worse case latency is 5 ms then the minimum_rate should be set to 100 mb/s.

If maximum queue depth is reached some sort of tail drop will prevent further growth.

Several limitations to the legacy approach are apparent from the example. The flows are unfairly penalized and the drops are indiscriminately performed. In the above example, the slow Group5 packet caused the following Group3 packet to be dropped. A fair system would penalize Group5. Also, since Group4 packets appear most frequently they are most likely to be dropped even though other groups are causing the HOLB problem as the dequeue rate of Group4 is not taken into consideration. Further, it is not possible to tell whether blocking is due to certain groups or certain subscriber egress ports so that it is not possible to isolate compliant traffic from offending traffic.

An example embodiment will now be described that utilizes per flow virtual clock meters which are implemented utilizing token buckets and virtual clock timers. All the virtual clock meters are set to the same target rate which is the minimum guaranteed rate for the queue.

In this example embodiment each meter has its own virtual clock which passes time only when a packet of a corresponding flow occupies the head of the queue. When other flows occupy the head of the queue the clock is paused and different meters are alternately active, depending on which flow currently occupies the head of the queue.

The virtual clocks produce no computational work load when they are not passing time.

Figure 4A:
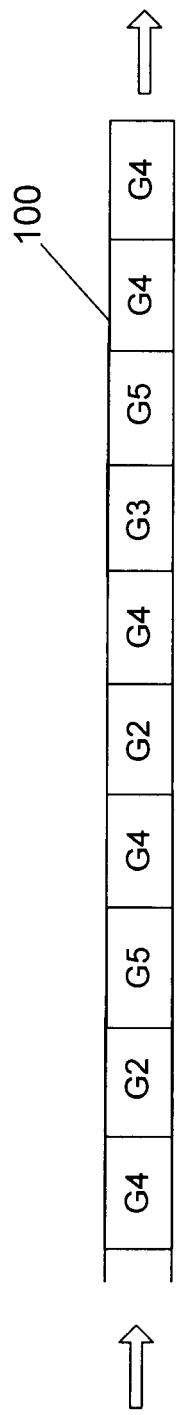
FIGS. 4A and B illustrate an example embodiment of per flow virtual clock meters.
Figure 4B:
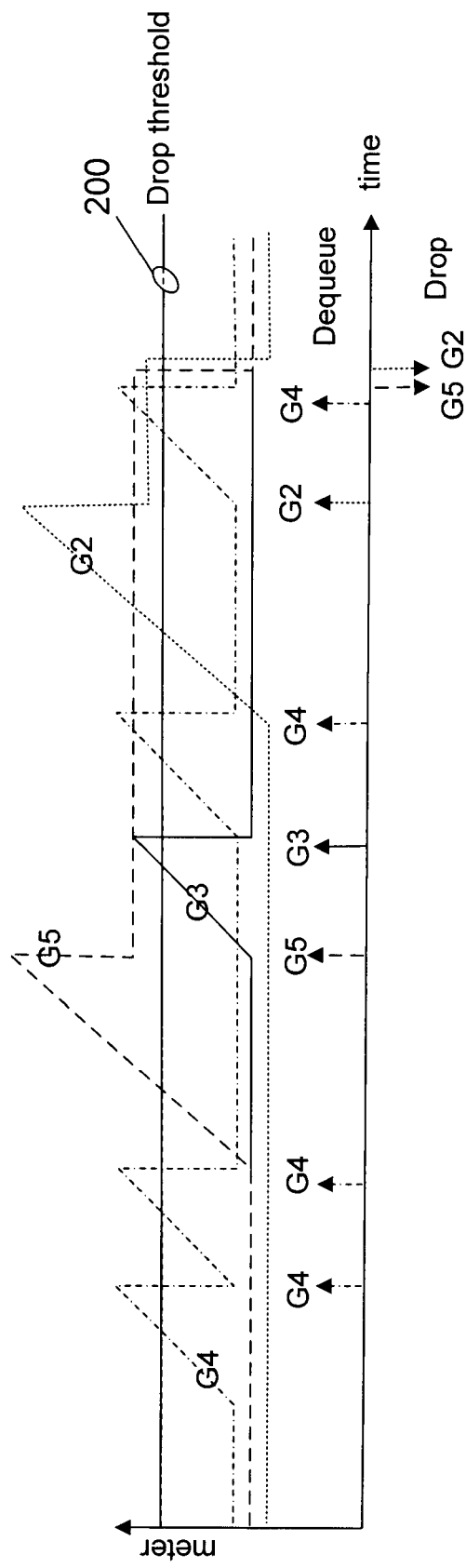

The operation of this example embodiment is depicted in FIGS. 4A and B. FIG. 4A depicts the same enqueued groups as FIG. 3A. FIG. 4B depicts a different meter for each flow group. Note that the meter for any flow group only increases in value when a packet from that group occupies the head of the queue and only decreases when a packet from the group is dequeued or dropped. The amount of the decrease is the length in bytes of the packet that is dequeued or dropped.

Figure 5:
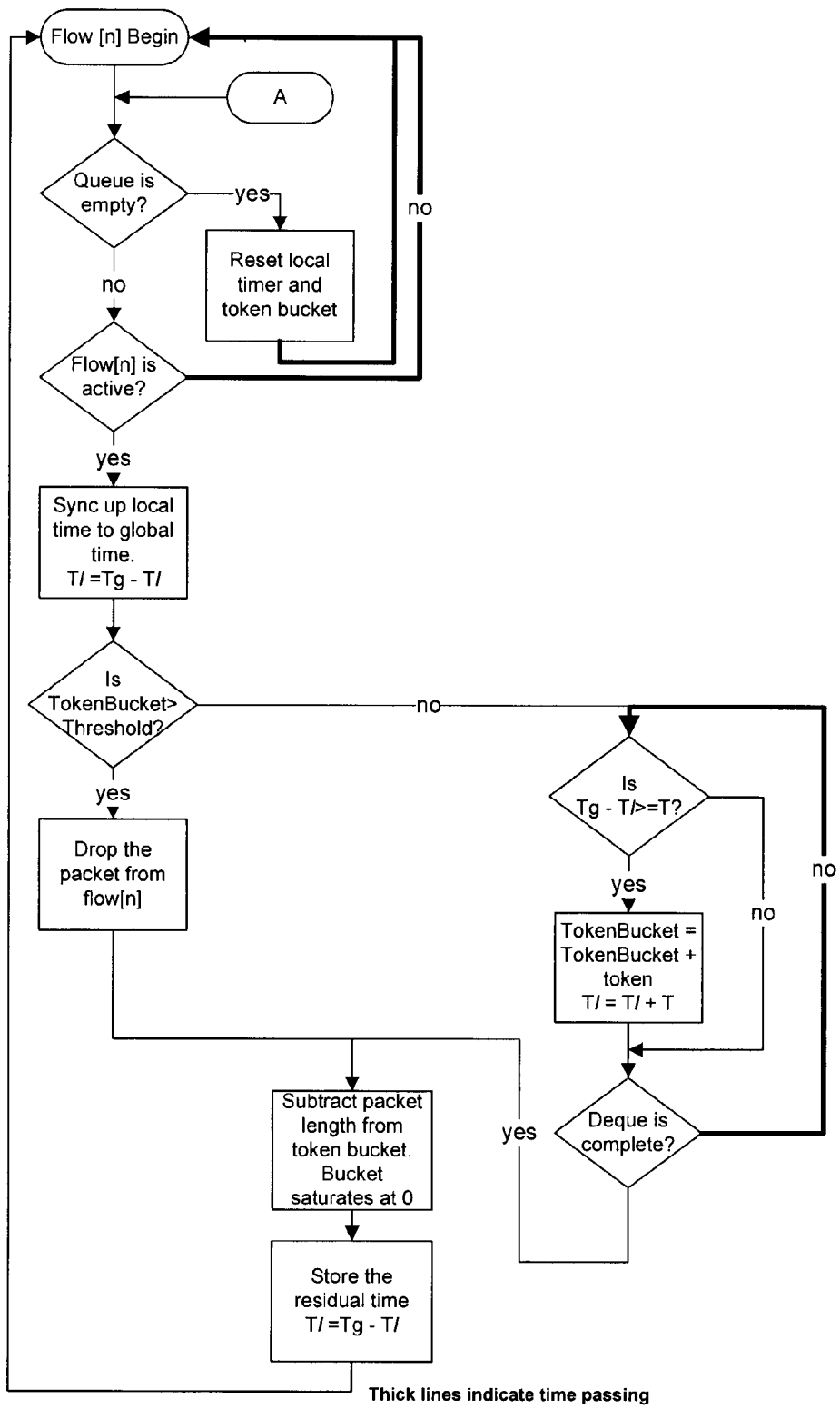
FIGS. 5 and 6 are flow charts illustrating example embodiments of algorithms.
Figure 6:
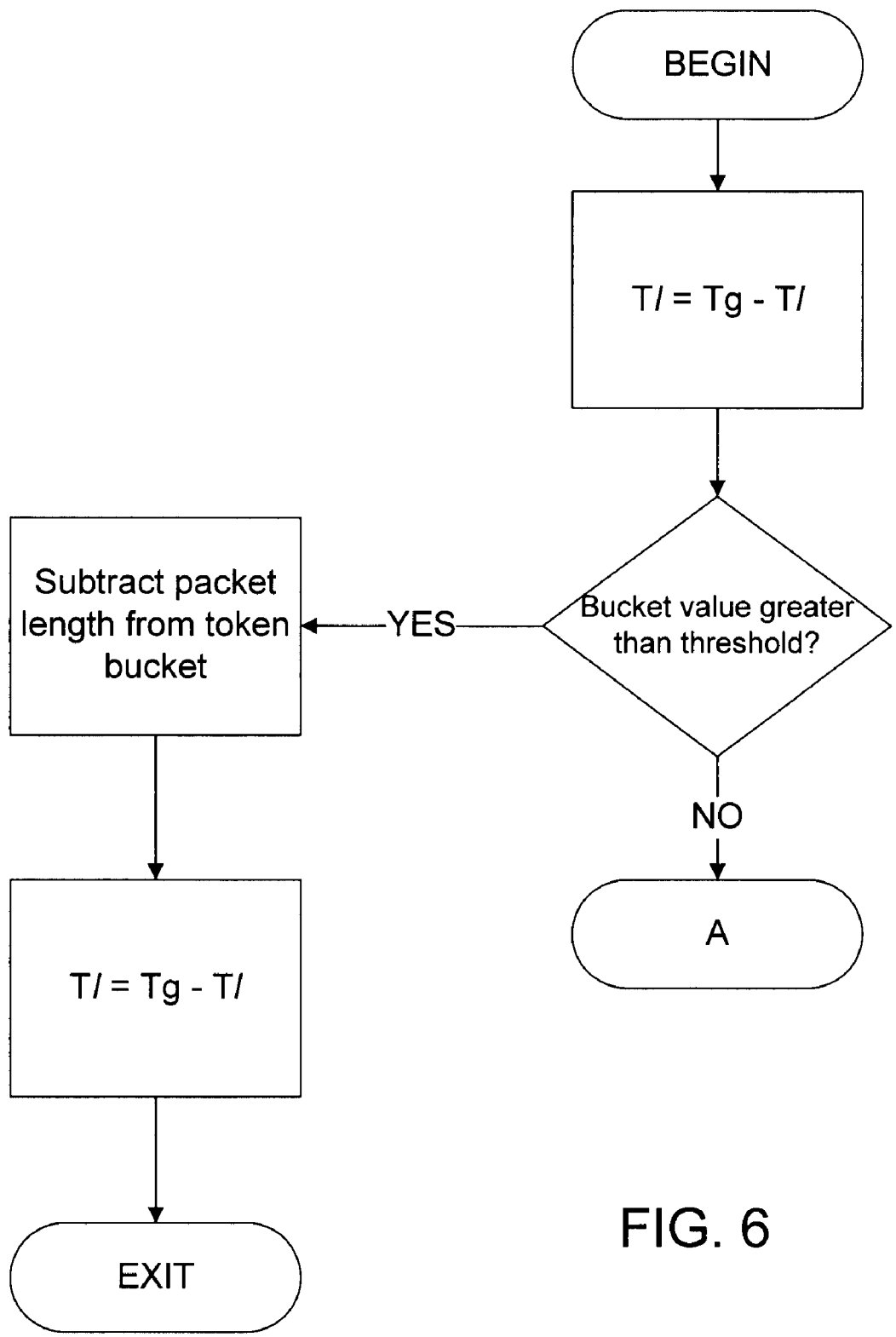

A more detailed description of the operation of the example embodiment will now be described with reference to the flow charts of FIGS. 5 and 6. This embodiment uses a token bucket algorithm where a constant packet background scanning process is responsible for counting up the active meter. A universal update interval (T) is chosen based on desired resolution where T=Q/r and Q is the granularity (in bytes) of the token bucket algorithm.

In practice the guaranteed scheduling resolution of a packet queuing system is at best one Maximum Transfer Unit (MTU) although typical resolution can be closer to average packet length. Usually Q does not need to be less than the average packet length. Choosing a higher value of Q increases the update interval and therefore reduces the computational load.

Tl represents real time when the flow is active and represents the "residual time" when the flow is inactive. When a flow transitions from active to inactive due to a dequeue event the Tl captures the "residual time" by Tl=(Tg−Tl). The "residual time" is always less than the periodic update time (T). When the flow transitions from inactive to active state due to an enqueue event the local timer changes back to be real time by setting Tl=(Tg−Tl). The operation of the example embodiment where the queue first becomes backlogged will now be described with reference to the flow chart of FIG. 5. The local timer (Tl) of the meter of the head of line flow (Flow1) is initialized to (Tg−Tl) so that it now represents absolute time. When a periodically scheduled update occurs (updates occur every T seconds) then, if the packet has not been dequeued, the elapsed time (Tg−Tl) is compared to T.

If the elapsed time is less that T then nothing is done. If the elapsed time is greater than T then Q bytes are added to the token bucket and the local time, Tl is increased by the update interval (T).

If the packet is not dequeued then tokens are continually added to the token bucket and value of T added to timer Tl every T seconds when periodic update is due. This way the local timer passes time at the same rate as the global timer, i.e., they both increase by the same amount during the same period (utmost off by T). When the packet is dequeued the length of the packet (in bytes) is subtracted from the number of bytes in the token bucket.

For as long as the head of line packet is not from Flow1, the local clock is frozen and it keeps the value derived above.

The operation of the example embodiment when the next packet in Flow1 becomes the head of the queue will now be described with reference to the flow chart of FIG. 6.

The local timer is synched with the current real time (Tl=Tg−Tl). This way the time passed since last time the flow was active but not accounted for in the token bucket is included in the current timer value.

If the value in the bucket is above the threshold the packet is dropped and the packet length is subtracted from the value in the bucket. Otherwise, the process continues from point A of the algorithm described in FIG. 5.

To minimize packet drops all flows are reset as soon as the queue becomes empty.

The per flow meters of this example embodiment can be utilized to address different types of blocking. In multicast group to group blocking each flow is defined as a unique multicast group and there is a flow meter for each group. At any one moment only one meter is active because only one packet can occupy the head of the queue so the algorithm is constant-time and scales regardless of the number of flows present. Also, packets are dropped discriminately, i.e., only packets from non-compliant flows are dropped.

Alternatively, a flow can be defined as a fan-out egress port and there is one meter for each port. Multiple meters may be active in parallel but the algorithm still scales well because the physical port count is much lower than the number of unique fan-out permutations. Only packets from the non-compliant ports are dropped and packets still reach the faster subscriber ports.

In this case the threshold of the per flow meter is set to a relatively low value as a large burst tolerance will let the average rate and instantaneous rate diverge. The queue's overall progress rate is equal to the per flow instantaneous rate, while packet drops are triggered by average rates.

Smaller threshold/burst tolerance may lead to a higher than necessary drop rate for flows with volatile output bandwidth. In order to mitigate the effect, a meter for the queue is added. This meter overrules the per flow meters so that drops only occurs if the queue is actually falling below the target rate. The queue meter is configured with a larger burst tolerance in order to minimize packet loss.

In this case, the actual implementation of the queue meter is the same as the legacy rate meter though it is used to complement the per flow meters.

Additionally, both multicast group to group blocking and subscriber port to port blocking can be addressed simultaneously by using both types of meters in parallel. A packet is dropped if either applicable meter decides to drop it.

In another example embodiment the per flow meters can be implemented utilizing timestamps but no token buckets. A timestamp Ts is initially synched to the real time (Ts=Tg). When the first packet is dequeued the timestamp meter is advanced to Ts=Ts+(packet length/r). The time is then adjusted for the real time that has passed since activation (Ts=Ts−Tg') where real time has passed between Tg and Tg'.

When the next packet associated with the flow comes to the head of the queue the meter is reactivated and if Ts is negative the packet is dropped. Ts is synched with the current real time (Ts=Ts+Tg). The algorithm then proceeds as described above.

The timestamp example embodiment requires a divider to calculate (packet length/r) which requires a divider and is more costly to implement in hardware. However for a purely software based implementation it is appropriate as there is no need for periodic updates therefore process switching is minimized.

Figure 7:
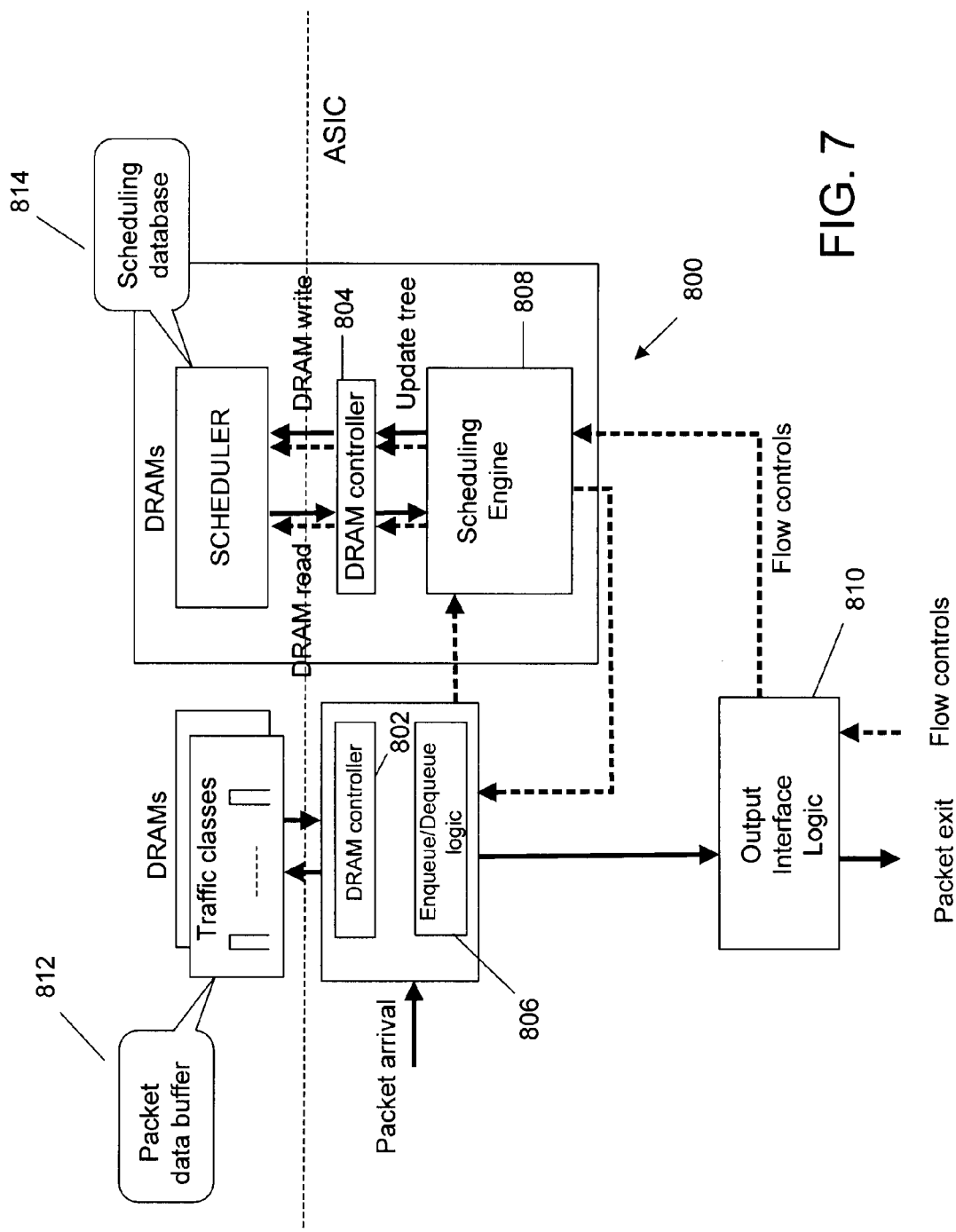
FIG. 7 illustrates an example of a system for implementing the example embodiments.

FIG. 7 depicts an example embodiment of a scheduler implemented as an Application Specific Integrated Circuit (ASIC) with surrounding circuitry. In FIG. 7, the functional units integrated into ASIC 800 include First and Second DRAM Controllers 802 and 804, Enqueue/Dequeue Logic Block 806, a Scheduling Engine 808, and an Output Interface Block 810. A Packet Buffer 812 for holding Traffic Class queues is formed by a first set of off-chip DRAMs 812 and a Scheduling Database formed by a second set of DRAMs 814.

When a packet in a flow arrives the Enqueue/Dequeue Logic Block 606 enqueues the packet in a traffic class queue according to its flow. Subsequent to the scheduling of a packet the Enqueue/Dequeue Logic Block 806 passes the traffic class information of the new head packet in the traffic class queue to the Scheduling Engine 808. The Scheduling Engine 808 then schedules the next packet to be transmitted and controls the Enqueue/Dequeue Logic Block 806 to dequeue the packet and forward it to the Output Interface Logic Block 810. The Output Interface Logic Block 810 then transmits the packet over the channel.

In FIG. 7 packets are received at a line rate and stored in memory, in this example a high speed DRAM. The queues include pointers to enqueued packets held in the DRAM. A packet transmit dequeue logic includes a scheduler that selects the next packet to be transmitted based on selected rules. A pointer to the next packet scheduled to transmit is used to access the packet and output it from the DRAM. The scheduling engine 808 performs scheduling operations and the algorithms described with reference to FIGS. 4 and 5.

In the above example embodiment the scheduling engine is implemented with programmed logic, e.g., an application specific integrated circuit (ASIC). The scheduling engine can also be implemented as a computer system executing program code.

Figure 8:
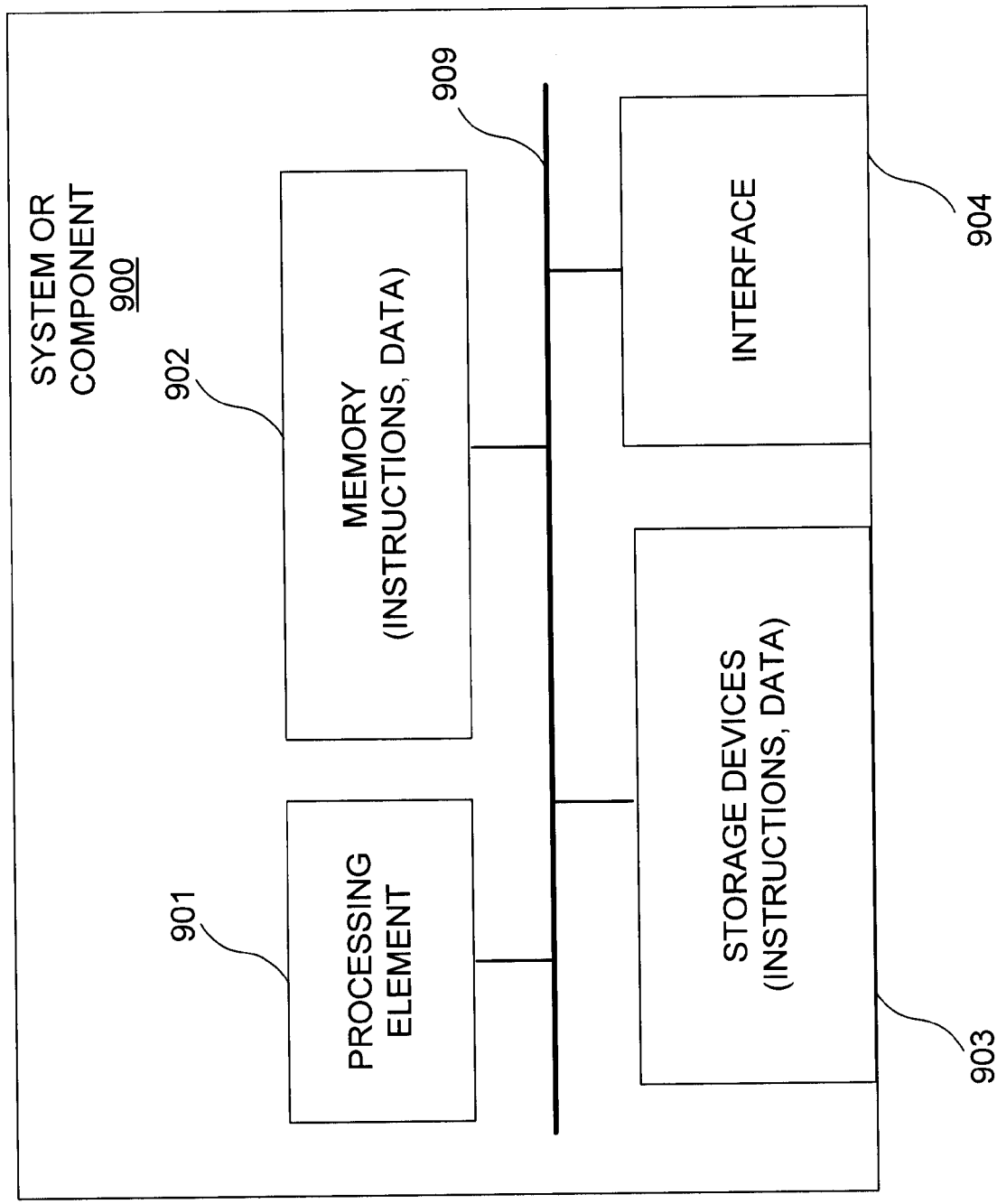
FIG. 8 illustrates an example of a computer system.

FIG. 8 shows a system block diagram of computer system 900 that may be used to execute software of an example embodiment. The computer system 900 includes memory 902 which can be utilized to store and retrieve software programs incorporating computer code that implements the algorithms described with reference to FIGS. 5 and 6, data for use with the algorithms, and the like.

Exemplary computer readable storage media include CD-ROM, floppy disk, tape, flash memory, system memory, and hard drive. Computer system 900 further includes subsystems such as a central processor 904, fixed storage 906, removable storage 908, and one or more network interfaces 910. Other computer systems suitable for use with the invention may include additional or fewer subsystems.

The system bus architecture of computer system 900 is represented by arrows 912 in FIG. 8. However, these arrows are only illustrative of one possible interconnection scheme serving to link the subsystems. For example, a local bus may be utilized to connect the central processor 904 to the system memory 902. Computer system 900 shown in FIG. 8 is only one example of a computer system suitable for use with the invention. Other computer architectures having different configurations of subsystems may also be utilized. Communication between computers within the network is made possible with the use of communication protocols, which govern how computers exchange information over a network.

The invention has now been described with reference to the example embodiments. Alternatives and substitutions will now be apparent to persons of skill in the art. Accordingly, it is not intended to limit the invention except as provided by the appended claims.

What is claimed is:

1. A method comprising:

changing a first meter value at a target rate in a first direction, where the first direction is either positive or negative, while a first packet of a first flow occupies the head of a shared transmit queue enqueing packets from different flows, with the first meter value indicating the amount of time the first packet in the first flow occupies the head of the shared transmit queue and with the packet characterized by a packet length indicating the number of bytes transmitted when the packet in the first flow is dequeued;

changing the first meter value in a second direction, where the second direction is opposite the first direction, by a multiple of the packet length of the first packet in the first flow when the first packet in the first flow is dequeued or dropped;

changing a second meter value at the target rate in the first direction while a first packet of a second flow occupies the head of the shared transmit queue, with the second meter value indicating the amount of time the first packet in the second flow occupies the head of the shared transmit queue and with the first packet in the second flow characterized by a packet length indicating the number of bytes transmitted when the first packet second flow is dequeued;

changing the second meter value in the second direction by a multiple of the packet length of the first packet in the second flow when the first packet in the second flow is dequeued or dropped;

comparing the first meter value to a threshold value when a second packet in the first flow occupies the head of the shared transmit queue;

dropping the second packet in the first flow if the difference between the first meter value and the threshold value has a first sign, where the first sign is either positive or negative, or scheduling the second packet in the first flow for dequeing if the difference between the first meter value and the threshold value has a second sign;

comparing the second meter value to the threshold value when a second packet in the second flow occupies the head of the shared transmit queue; and dropping the second packet in the second flow if the difference between the second meter value and the threshold value has the first sign or scheduling the second packet in the second flow for dequeing if the difference between the second meter value and the threshold value has the second sign, where the second sign is opposite the first sign.

2. The method of claim 1 where the first direction is the positive direction and changing the first and second meter values in the first direction at the target rate comprises:

adding Q bytes to a first token bucket for each interval of T seconds that a packet of the first flow occupies the head of the shared transmit queue; and adding Q bytes to a second token bucket for each interval of T seconds that a packet of the second flow occupies the head of the shared transmit queue, where Q/T is equal to a target rate.

3. The method of claim 2 where comparing the first and second meter values to a threshold comprises:

comparing the value held in the first bucket to the threshold when a packet of the first flow occupies the head of the shared transmit queue; and comparing the value held in the second bucket to the threshold when a packet of the second flow occupies the head of the shared transmit queue.

4. The method of claim 2 where changing the first and second meter values in the second direction comprises:

subtracting the length of a packet in the first flow from the number of bytes held in the first bucket when the packet in the first flow is dequeued; and subtracting the length of a packet in the second flow from the number of bytes held in the second bucket when the packet in the second flow is dequeued.

5. The method of claim 1 further comprising:

initializing a local time (Tl) to Tl−Tg, where Tg is a global clock value, when a packet of the first flow occupies the head of the shared transmit queue;

comparing elapsed time, Tg−Tl, to T when an update occurs; and adding Q bytes to a first token bucket if the elapsed time is greater than T, where Q/T is equal to a target rate.

6. The method of claim 1 where the first direction is the negative direction and changing the first and second meter values in the first direction comprises:

subtracting a first global finish time value, indicating the time when the first packet in the first flow is dequeued, from a first timestamp equal to a first global start time value indicating when the packet in the first flow arrived at the head of the shared transmit queue; and subtracting a second global finish time value, indicating the time when the first packet in the second flow is dequeued, from a second timestamp equal to a second global start time value indicating when the packet in the second flow arrived at the head of the shared transmit queue.

7. The method of claim 6 where changing the first and second meter values in the second direction comprises:

adding the length of the first packet in the first flow divided by a transmission rate to the first timestamp; and adding the length of the first packet in the second flow divided by the transmission rate to the second timestamp.

8. An apparatus comprising:

a memory block configured to hold packet queues including a shared transmit queue enqueing packet from different flows;

an enqueue/dequeue logic block;

a scheduling block, coupled to the memory block and the enqueue/dequeue logic block, with the scheduling block including logic configured to implement virtual per flow rate meters by changing a first meter value in a first direction at a target rate, where the first direction is either positive or negative, while a first packet of a first flow enqueued in the shared transmit queue occupies the head of the shared transmit queue, with the first meter value indicating the amount of time the first packet in the first flow occupies the head of the shared transmit queue and with the first packet in first flow characterized by a packet length indicating the number of bytes transmitted when the first packet in the first flow is dequeued, changing the first meter value in a second direction, where the second direction is opposite the first direction, by a multiple of the packet length of the first packet in first flow when the first packet in the first flow is dequeued or dropped, changing a second meter value in the first direction at the target rate while a first packet of a second flow enqueued in the shared packet queue occupies the head of the shared transmit queue, with the second meter value indicating the amount of time the first packet in the second flow occupies the head of the shared transmit queue and with the first packet in the second flow characterized by a packet length indicating the number of bytes transmitted when the first packet in the second flow is dequeued, changing the second meter value in the second direction by a multiple of the length of the first packet in the second flow when the first packet in the second flow is dequeued or dropped, comparing the first meter value to a threshold value when a second packet in the first flow occupies the head of the shared transmit queue, dropping the second packet in the first flow if the difference between the first meter value and the threshold value has a first sign, where the first sign is either positive or negative, or scheduling the second packet in the first flow for dequeing if the difference between the first meter value and the threshold value has a second sign, comparing the second meter value to the threshold value when a second packet in the second flow occupies the head of the shared transmit queue, and dropping the second packet in the second flow if the difference between the second meter value and the threshold value has the first sign or scheduling the second packet in the second flow for dequeing if the difference between the second meter value and the threshold value has the second sign, where the second sign is opposite the first sign.

9. The apparatus of claim 8 where the first direction is the positive direction and where the logic configured to implement virtual flow rate meters by changing the first and second meter values at the target rate in the first direction comprises logic configured to:

add Q bytes to a first token bucket for each interval of T seconds that a packet of the first flow occupies the head of the shared transmit queue; and add Q bytes to a second token bucket for each interval of T seconds that a packet of the second flow occupies the head of the shared transmit queue, where Q/T is equal to a target rate.

10. The apparatus of claim 9 where the logic configured to implement virtual flow rate meters by comparing the first and second meter values to a threshold comprises logic configured to:

compare the value held in the first bucket to the threshold when a packet of the first flow occupies the head of the shared transmit queue; and compare the value held in the second bucket to the threshold when a packet of the second flow occupies the head of the shared transmit queue.

11. The apparatus of claim 9 where the logic configured to implement virtual flow rate meters by changing the first and second meter values in the second direction comprises logic configured to:

subtracting the length of a packet in the first flow from the number of bytes held in the first bucket when the packet in the first flow is dequeued; and subtracting the length of a packet in the second flow from the number of bytes held in the second bucket when the packet in the second flow is dequeued.

12. The apparatus of claim 8 where the logic configured to implement virtual flow rate meters further comprises logic configured to:

initialize a local time (Tl) to Tg−Tl, where Tg is a global clock value, when a packet of the first flow occupies the head of the shared transmit queue;

compare elapsed time, Tg−Tl, to T when an update occurs; and add Q bytes to a first token bucket if the elapsed time is greater than T, where Q/T is equal to a target rate.

13. The apparatus of claim 8 where the first direction is the negative direction where the logic configured to implement virtual flow rate meters by changing the first and second meter values in the first direction comprises logic configured to:

subtract a first global finish time value, indicating the time when the first packet in the first flow is dequeued, from a first timestamp equal to a first global start time value indicating when the packet in the first flow arrived at the head of the shared transmit queue; and subtract a second global finish time value, indicating the time when the first packet in the second flow is dequeued, from a second timestamp equal to a second global start time value indicating when the packet in the second flow arrived at the head of the shared transmit queue.

14. The apparatus of claim 13 where the logic configured to implement virtual flow rate meters by changing the first and second meter values in the second direction comprises logic configured to:

add the length of the first packet in the first flow divided by a transmission rate to the first timestamp; and add the length of the first packet in the second flow divided by the transmission rate to the second timestamp.

15. One or more computer readable storage media encoded with software comprising computer executable instructions and with the software operable to:
- change a first meter value at a target rate in a first direction, where the first direction is either positive or negative, while a first packet of a first flow occupies the head of a shared transmit queue enqueing packets from different flows, with the first meter value indicating the amount of time the first packet in the first flow occupies the head of the shared transmit queue and with the packet characterized by a packet length indicating the number of bytes transmitted when the packet in the first flow is dequeued;
- change the first meter value in a second direction, where the second direction is opposite the first direction, by a multiple of the packet length of the first packet in the first flow when the first packet in the first flow is dequeued or dropped;
- change a second meter value at the target rate in the first direction while a first packet of a second flow occupies the head of the shared transmit queue, with the second meter value indicating the amount of time the first packet in the second flow occupies the head of the shared transmit queue and with the first packet in the second flow characterized by a packet length indicating the number of bytes transmitted when the first packet second flow is dequeued;
- change the second meter value in the second direction by a multiple of the packet length of the first packet in the second flow when the first packet in the second flow is dequeued or dropped;
- compare the first meter value to a threshold value when a second packet in the first flow occupies the head of the shared transmit queue;
- drop the second packet in the first flow if the difference between the first meter value and the threshold value has a first sign, where the first sign is either positive or negative, or scheduling the second packet in the first flow for dequeing if the difference between the first meter value and the threshold value has a second sign;
- compare the second meter value to the threshold value when a second packet in the second flow occupies the head of the shared transmit queue; and
- compare the second packet in the second flow if the difference between the second meter value and the threshold value has the first sign or scheduling the second packet in the second flow for dequeing if the difference between the second meter value and the threshold value has the second sign, where the second sign is opposite the first sign.

16. The one or more computer readable storage media of claim 15 where the encoded software operable to change the first and second meter values at the target rate in the first direction, where the first direction is the positive direction, is operable to:
- add Q bytes to a first token bucket for each interval of T seconds that a packet of the first flow occupies the head of the shared transmit queue; and
- add Q bytes to a second token bucket for each interval of T seconds that a packet of the second flow occupies the head of the shared transmit queue, where Q/T is equal to a target rate.

17. The one or more computer readable storage media of claim 16 where the encoded software operable to compare the first and second meter values to a threshold is operable to:
- compare the value held in the first bucket to the threshold when a packet of the first flow occupies the head of the shared transmit queue; and
- compare the value held in the second bucket to the threshold when a packet of the second flow occupies the head of the shared transmit queue.

18. The one or more computer readable storage media of claim 16 where the encoded software operable to change the first and second meter values in the second direction is operable to:
- subtract the length of a packet in the first flow from the number of bytes held in the first bucket when the packet in the first flow is dequeued; and
- subtract the length of a packet in the second flow from the number of bytes held in the second bucket when the packet in the second flow is dequeued.

19. The one or more computer readable storage media of claim 15 where the encoded software is further operable to:
- initialize a local time (Tl) to Tg−Tl, where Tg is a global clock value, when a packet of the first flow occupies the head of the shared transmit queue;
- compare elapsed time, Tg−Tl, to T when an update occurs; and
- add Q bytes to a first token bucket if the elapsed time is greater than T, where Q/T is equal to a target rate.

20. The one or more computer readable storage media of claim 15 where the encoded software operable to change the first and second meter values in the first direction, where the first direction is the negative direction, is further operable to:
- subtract a first global finish time value, indicating the time when the first packet in the first flow is dequeued, from a first timestamp equal to a first global start time value indicating when the packet in the first flow arrived at the head of the shared transmit queue; and
- subtract a second global finish time value, indicating the time when the first packet in the second flow is dequeued, from a second timestamp equal to a second global start time value indicating when the packet in the second flow arrived at the head of the shared transmit queue.

21. The one or more computer readable storage media of claim 20 where the encoded software operable to change the first and second meter values in the second direction is further operable to:
- add the length of the packet in the first flow divided by a transmission rate to the first timestamp; and
- add the length of the packet in the second flow divided by the transmission rate to the second timestamp.

* * * * *